US008806212B2

(12) United States Patent
Shin et al.

(10) Patent No.: US 8,806,212 B2
(45) Date of Patent: Aug. 12, 2014

(54) METHOD AND APPARATUS FOR GENERATING AND VERIFYING ELECTRONIC SIGNATURE OF SOFTWARE DATA, AND COMPUTER READABLE RECORDING MEDIUM THEREOF

(75) Inventors: Jun-Bum Shin, Suwon-si (KR); Choong-hoon Lee, Seoul (KR); Su-hyun Nam, Seoul (KR); Yang-lim Choi, Seongnam-si (KR); Ji-soon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1575 days.

(21) Appl. No.: 12/191,464

(22) Filed: Aug. 14, 2008

(65) Prior Publication Data

US 2009/0204818 A1    Aug. 13, 2009

(30) Foreign Application Priority Data

Feb. 13, 2008    (KR) .................. 10-2008-0013004

(51) Int. Cl.
  *G06F 21/00*    (2013.01)
(52) U.S. Cl.
  USPC ........................................ 713/176; 713/187
(58) Field of Classification Search
  USPC ............. 713/175, 176, 180, 187; 726/26, 27
  See application file for complete search history.

(56) References Cited

U.S. PATENT DOCUMENTS

| | | | | |
|---|---|---|---|---|
| 5,745,678 | A * | 4/1998 | Herzberg et al. | 726/32 |
| 6,009,176 | A * | 12/1999 | Gennaro et al. | 713/170 |
| 7,325,145 | B1 * | 1/2008 | England | 713/187 |
| 8,341,422 | B2 | 12/2012 | Kiehtreiber et al. | |
| 2002/0152389 | A1 * | 10/2002 | Horita et al. | 713/180 |
| 2003/0115282 | A1 * | 6/2003 | Rose | 709/214 |
| 2004/0258243 | A1 * | 12/2004 | Shin et al. | 380/210 |
| 2005/0050332 | A1 * | 3/2005 | Serret-Avila et al. | 713/176 |
| 2005/0097313 | A1 * | 5/2005 | Bolosky et al. | 713/150 |
| 2006/0136728 | A1 * | 6/2006 | Gentry et al. | 713/176 |
| 2006/0259587 | A1 * | 11/2006 | Ackerman et al. | 709/219 |
| 2007/0150596 | A1 * | 6/2007 | Miller et al. | 709/226 |
| 2007/0198838 | A1 * | 8/2007 | Nonaka et al. | 713/176 |
| 2008/0022135 | A1 * | 1/2008 | Gaya | 713/193 |

FOREIGN PATENT DOCUMENTS

JP    2007-506187 A    3/2007

OTHER PUBLICATIONS

Communication dated Dec. 2, 2013 issued by the Korean Intellectual Property Office in counterpart Korean Patent Application No. 10-2008-0013004.

* cited by examiner

*Primary Examiner* — Chau Le
(74) *Attorney, Agent, or Firm* — Sughrue Mion, PLLC (57) ABSTRACT

Provided are methods of generating and verifying an electronic signature of software data, wherein software data is split into a plurality of blocks, electronic signatures corresponding to each of the blocks are generated, and some of the electronic signatures are randomly selected for verification. Accordingly, a time required for verifying an electronic signature can be reduced while maintaining the advantages of an electronic signature system.

8 Claims, 7 Drawing Sheets

METHOD AND APPARATUS FOR GENERATING AND VERIFYING ELECTRONIC SIGNATURE OF SOFTWARE DATA, AND COMPUTER READABLE RECORDING MEDIUM THEREOF

CROSS-REFERENCE TO RELATED PATENT APPLICATION

This application claims priority from Korean Patent Application No. 10-2008-0013004, filed on Feb. 13, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to an electronic signature, and more particularly, to generating an electronic signature, which can be verified in a shorter time, and a computer readable recording medium including a computer program for executing the method.

2. Description of the Related Art

To prevent illegal modification of software data stored in a user device, it needs to be verified whether the software data is identical to the original copy. Illegal modification of software data may occur in various situations, such as hacking copyright-protected content, etc.

It is assumed that particular applications allow playback of content only if the content is proven to be valid by verifying an electronic signature of the content. In this case, a hacker may attempt to modify a validity verifying module of the application so as to allow the playback of invalid content.

Therefore, when the application is modified, the application should not play back content protected by a digital right management (DRM) technology. An example of DRM technology for ensuring that an application does not play back content when the application is modified is an advanced access content system (AACS).

An electronic signature is the most commonly used method for verifying illegal modification of software data. In other words, software data and an electronic signature corresponding to the software data are stored in a user device together. When the user device operates, it is decided whether to execute the software data or not based on a result of verifying the electronic signature.

Verifying an electronic signature is advantageous in terms of verifying illegal modification of software data such as firmware. However, it may take an extended period of time to verify an electronic signature according to performance of a user device, and thus it is necessary to reduce the time required to verify an electronic signature while maintaining the advantages of an electronic signature system.

SUMMARY OF THE INVENTION

The present invention provides methods and apparatuses for generating and verifying an electronic signature of software data, the methods being capable of reducing a time required for verification while maintaining the advantages of an electronic signature system, and a computer readable recording medium having recorded thereon a computer program for executing the method.

According to an aspect of the present invention, there is provided a method of generating an electronic signature of software data, the method including splitting the software data into a plurality of first blocks each having a pre-determined data capacity, generating a plurality of second blocks each of which is a combination of the first blocks, and generating electronic signatures corresponding to each of the second blocks.

The splitting of the software data may include sequentially splitting the software data into a plurality of third blocks each having a data capacity larger than that of each of the first blocks, splitting each of the third blocks into one or more sub-blocks each having a data capacity smaller than or equal to that of each of the third blocks, and generating the first blocks by combining the sub-blocks belonging to the same third block or different sub-blocks.

If the software data includes M first blocks and N second blocks, an $m^{th}$ first block may be assigned to a second block corresponding to a value of m mod N in the generating of the second blocks, where M refers to the number of the first blocks, N refers to the number of the second blocks, m is greater than zero and is smaller than or equal to M, and M, N, and m may be integers.

Some of the first blocks may be duplicately-assigned to two or more of the second blocks in the generating of the second blocks.

Data capacities of the first blocks, the second blocks, and the third blocks may be fixed or may vary.

The generation of an electronic signature may include calculating hash values for each of the second blocks, and generating electronic signatures which each correspond to each of the hash values.

According to another aspect of the present invention, there is provided a method of verifying an electronic signature of software data, the method including randomly selecting one or more of electronic signatures corresponding to a plurality of second blocks forming the software data, and verifying the selected electronic signatures, wherein the second blocks are generated by combining a plurality of first blocks each having a pre-determined data capacity, and the software data is split into the first blocks.

The verification of electronic signatures may further include storing results of verifying the electronic signatures, and selectively updating the software data based on the stored results of verifying the electronic signatures prior to randomly selecting one or more of the electronic signatures.

According to another aspect of the present invention, there is provided an apparatus for generating an electronic signature of software data, the apparatus including a data splitting unit which splits the software data into a plurality of first blocks each having a pre-determined data capacity, a block generating unit which generates a plurality of second blocks each of which is a combination of the first blocks, and a signature generating unit which generates electronic signatures corresponding to each of the second blocks.

According to another aspect of the present invention, there is provided an apparatus for verifying an electronic signature of software data, the apparatus including a block selecting unit which randomly selects one or more electronic signatures corresponding to a plurality of second blocks forming the software data, and a signature verifying unit which verifies the selected electronic signatures, wherein the second blocks are generated by combining a plurality of first blocks each having a pre-determined data capacity, and the software data is split into the first blocks.

According to another aspect of the present invention, there is provided a computer readable recording medium having recorded thereon a computer program for executing a method of generating an electronic signature of software data, the method including splitting the software data into a plurality of first blocks each having a pre-determined data capacity, generating a plurality of second blocks each of which is a combination of the first blocks, and generating electronic signatures corresponding to each of the second blocks.

According to another aspect of the present invention, there is provided a computer readable recording medium having recorded thereon a computer program for executing a method of verifying an electronic signature of software data, the method including randomly selecting one or more of electronic signatures corresponding to a plurality of second blocks forming the software data, and verifying the selected electronic signatures, wherein the second blocks are generated by combining a plurality of first blocks each having a pre-determined data capacity, and the software data is split into the first blocks.

According to an aspect of the present invention, software data is split into a plurality of blocks, electronic signatures corresponding to each of the blocks are generated, and part of the electronic signatures are randomly selected for verification. Accordingly, time required for verifying an electronic signature can be reduced while maintaining advantages of an electronic signature system.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
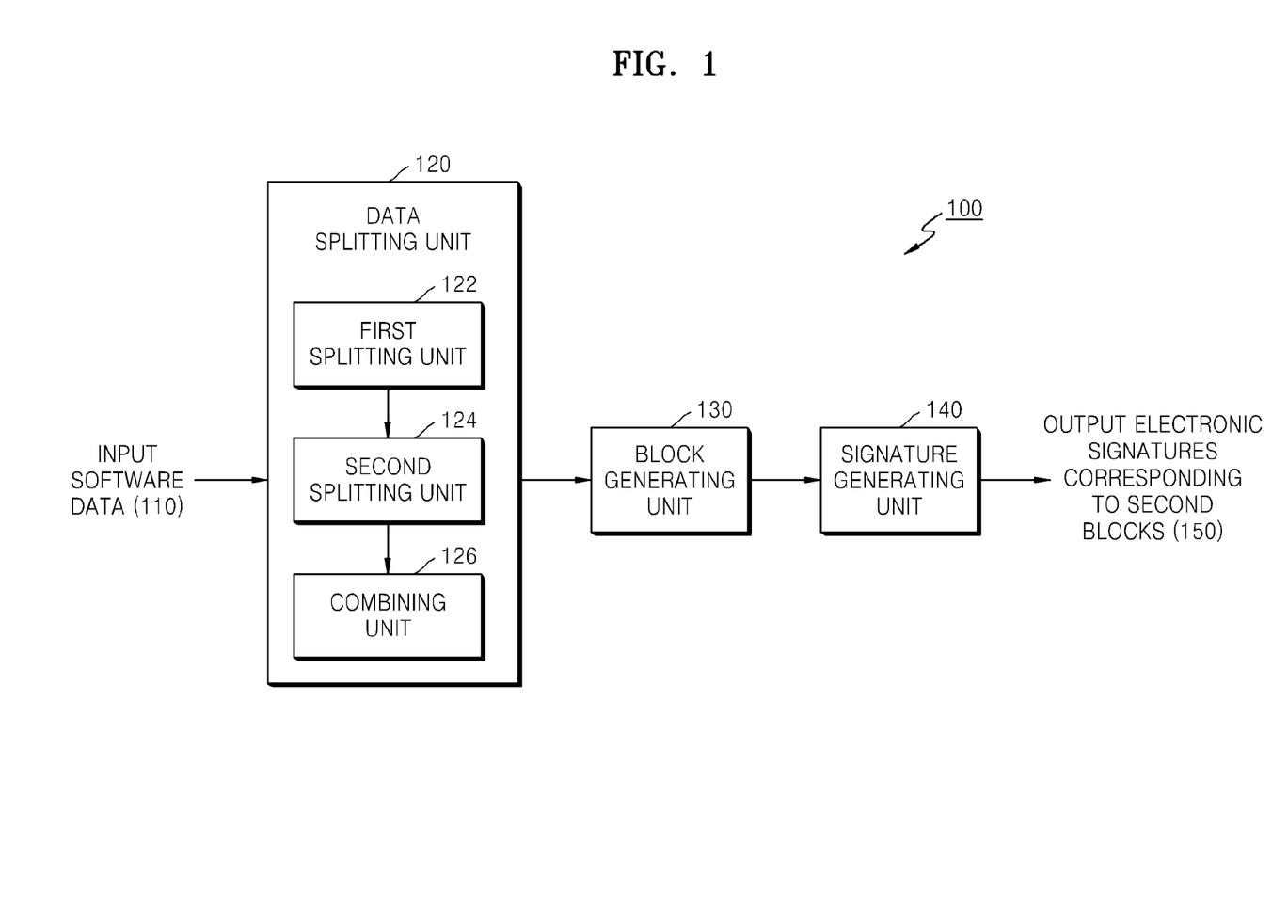
FIG. 1 is a block diagram of an electronic signature generating apparatus according to an exemplary embodiment of the present invention.

FIG. 1 is a block diagram of an electronic signature generating apparatus 100 according to an embodiment of the present invention.

Referring to FIG. 1, the electronic signature generating apparatus 100 is an apparatus generating an electronic signature corresponding to software data such as firmware for operating a user apparatus. The electronic signature generating apparatus 100 includes a data splitting unit 120, a block generating unit 130, and a signature generating unit 140.

Figure 2:
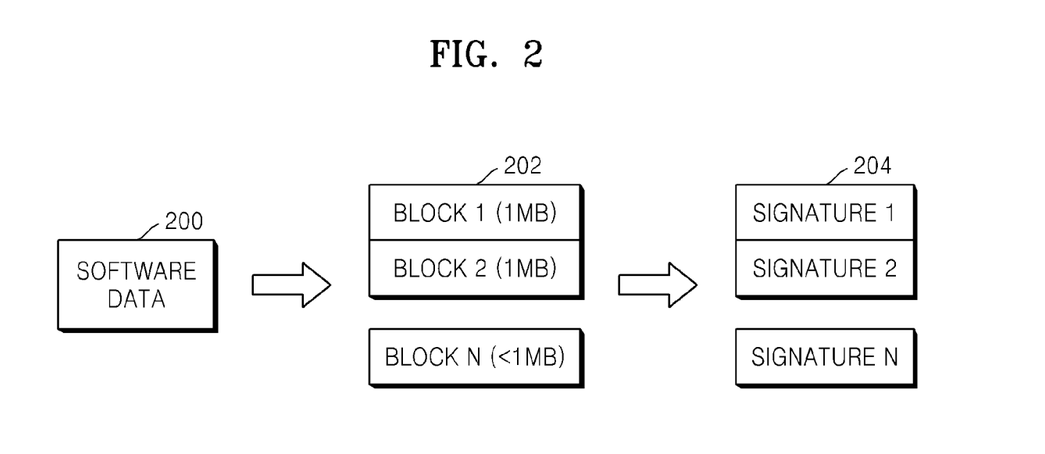
FIG. 2 is a diagram illustrating an example of the operation of the electronic signature generating apparatus shown in FIG. 1.

The data splitting unit 120 splits input software data 110 into a plurality of first blocks. The first blocks refer to data fragments each having a pre-determined data capacity, and the size of the input software data 110 is larger than a data capacity of each of the first blocks. For example, if the size of the input software data 110 is 10.5 megabytes (MB) and the data capacity of each of the first blocks is 1 MB, the data splitting unit 120 may split the input software data 110 into 10 first blocks each having a data capacity of 1 MB and one first block having a data capacity of 0.5 MB. Splitting software data 200 into a plurality of first blocks 202 each having a data capacity of 1 MB or less is shown in FIG. 2.

The data splitting unit 120 may include a first splitting unit 122, a second splitting unit 124, and a combining unit 126. The present embodiment is for minimizing possible problems when the input software data 110 is split into the plurality of first blocks 202 and only some of the first blocks 202 are verified.

The first splitting unit 122 sequentially splits the input software data 110 into a plurality of third blocks. The third blocks are data fragments each having a pre-determined data capacity, and thus the third blocks are mostly identical to the first blocks 202. However, a data capacity of each of the third blocks is larger than that of each of the first blocks 202, and is smaller than the size of the input software data 110. The third blocks are defined for generating the first blocks 202 by using data obtained from various locations of the input software data 110, rather than generating the first blocks 202 by simply splitting the input software data 110 in sequence.

The second splitting unit 124 splits each of the third blocks into one or more sub-blocks each having a data capacity smaller than or equal to that of each of the third blocks. The sub-blocks are data fragments each having a pre-determined data capacity, and thus the sub-blocks are mostly identical to the third blocks. However, a data capacity of each of the sub-blocks is larger than that of each of the third blocks.

The combining unit 126 combines sub-blocks belonging to either the same third block or different third blocks and generates a first block.

Figure 3:
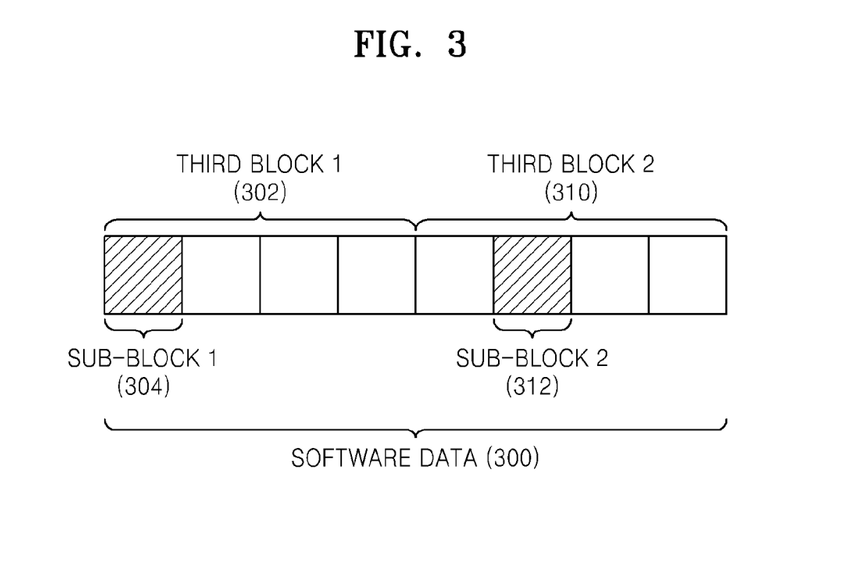
FIG. 3 is a diagram illustrating an example of generating a first block using third blocks and sub-blocks.

FIG. 3 is a diagram illustrating an example of generating a first block using third blocks 302 and 310 and sub-blocks 304 and 312.

Referring to FIG. 3, software data 300 is split into a third block 1 302 and a third block 2 310 by the first splitting unit 122 shown in FIG. 1. Then, the third block 1 302 and the third block 2 310 are respectively split in sequence into a plurality of sub blocks including the sub-block 304 and a plurality of sub-blocks including the sub-block 312 by the second splitting unit 124 shown in FIG. 1. The combining unit 126 thereafter combines the sub-block 304 belonging to the third block 1 302 and the sub-block 312 belonging to the third block 2 310 to generate a first block 1.

A first block can be generated by using various methods other than the aforementioned method. For example, the data splitting unit 120 can split software data in sequence. The data capacity of each of the first blocks may be fixed or may vary. However, if first blocks having varying data capacities are used, the data capacity of the first blocks should be recorded separately.

It is also possible to divide software data into a more significant portion and a less significant portion and to generate first blocks for each of the portions independently.

Referring back to FIG. 1, the block generation unit 130 generates a plurality of second blocks, each of which is a combination of the first blocks. The second blocks are data fragments each having a pre-determined data capacity, and thus the second blocks are mostly identical to the first blocks.

However, the data capacity of each of the second blocks is larger than that of each of the first blocks, and is smaller than the size of the input software data. The second blocks are generated by combining the first blocks for generating an electronic signature corresponding to data obtained from various locations of the input software data and for ensuring verification of an electronic signature corresponding to data designated as significant data by a user.

Alternatively, when the input software data 110 is split into M first blocks by the data splitting unit 120 (M refers to the number of the first blocks), the block generation unit 130 may assign an $m^{th}$ block of the first blocks to a particular second block corresponding to the value of m mod N (where N refers to the number of second blocks, M>N, 0<m<M, and M, N, and m are integers). As a result, the block generating unit 130 generates N second blocks.

Also, the block generating unit 130 may assign some of the first blocks to two or more of the second blocks. In other words, the first blocks storing data which is designated as significant data can be assigned to a plurality of the second blocks.

The second blocks can also be generated by various methods other than the aforementioned method. For example, when significance levels of data included in first blocks are all the same, the block generation unit 130 may assign M first blocks to N second blocks by using a function of correspondence between a set of the first blocks {1, ..., M} and a set of the second blocks {1, ..., N}. If the significance of the first blocks is not uniform, the block generating unit 130 may assign less significant first blocks to the second blocks one by one, and may assign more significant first blocks to all the second blocks.

Also, weights can be given to the more significant first blocks, so that the more significant first blocks may be assigned to more of the second blocks compared to the number of second blocks to which the less significant first blocks are assigned. For example, one of the first blocks belonging to the more significant first blocks may be duplicately-assigned to two second blocks.

Figure 4:
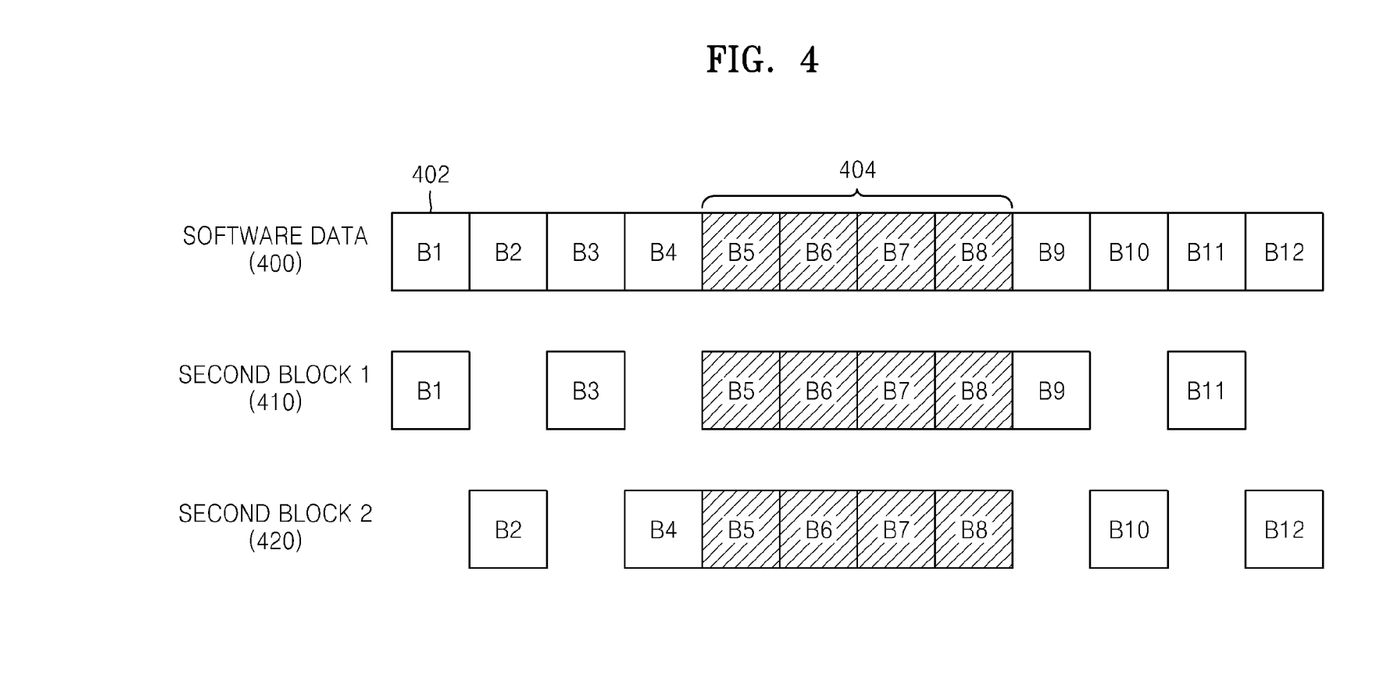
FIG. 4 is a diagram illustrating an example of duplicately-assigning some of first blocks to two or more second blocks.

FIG. 4 is a diagram illustrating an example of duplicately-assigning some of first blocks to two or more second blocks.

A software provider may be aware of which part of software data 400 includes more significant data. In this case, the electronic signature generating apparatus 100 first splits the software data 400 into a plurality of first blocks 402 and may assign a part 404 of the first blocks 402, wherein the part 404 includes more significant data, to both a second block 1 410 and a second block 2 420. The first blocks other than the part 404 may only be assigned to either the second block 1 410 or the second block 2 420.

Referring back to FIG. 1, the signature generating unit 140 generates and outputs electronic signatures which each correspond to each of the second blocks generated by the block generating unit 130. Alternatively, the signature generating unit 140 may calculate hash values for each of the second blocks and generate electronic signatures which each correspond to each of the hash values.

FIG. 2 is a diagram illustrating an example of the operation of the electronic signature generating apparatus 100 shown in FIG. 1. The software data 200 is split into a plurality of blocks 202, which are second blocks, according to the method described with reference to FIG. 1. Then, electronic signatures 204 which each correspond to each of the blocks 202 are generated.

Figure 5:
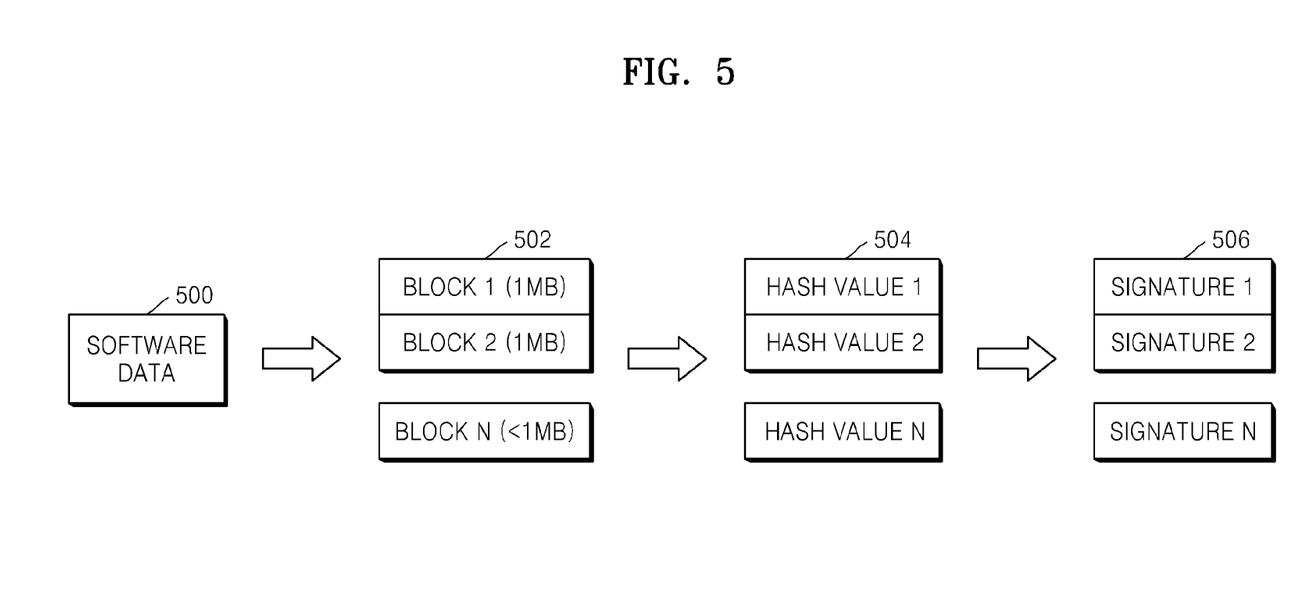
FIG. 5 is a diagram illustrating an example of generating electronic signatures each of which corresponds to each of hash values of second blocks

Also, FIG. 5 is a diagram illustrating an example of generating electronic signatures which each correspond to each of hash values of second blocks. Software data 500 is split into a plurality of second blocks 502. Hash values which each correspond to each of the second blocks 502 are calculated, and electronic signatures which each correspond to each of the hash values are generated.

Figure 6:
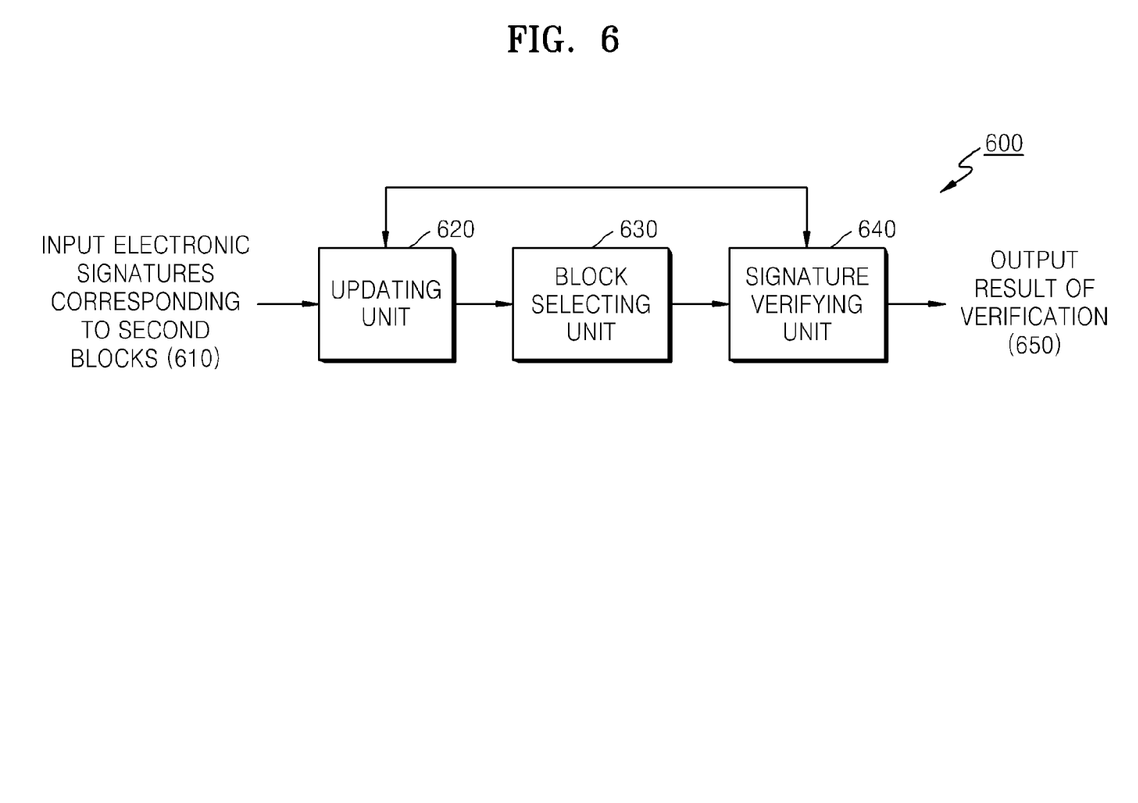
FIG. 6 is a block diagram of an electronic signature verifying apparatus according to an exemplary embodiment of the present invention.

FIG. 6 is a block diagram of an electronic signature verifying apparatus 600 according to an embodiment of the present invention.

Referring to FIG. 6, the electronic signature verifying apparatus 600 is an apparatus verifying an electronic signature of software data such as firmware by using the method according to the present invention. The electronic signature verifying apparatus 600 includes a block selecting unit 630 and a signature verifying unit 640. Also, the electronic signature verifying apparatus 600 may further include an updating unit 620.

The block selecting unit 630 randomly selects one or more of electronic signatures 610 corresponding to a plurality of second blocks forming software data. The second blocks are generated by combining first blocks having pre-determined data capacities, wherein the software data is split into the first blocks. Some of the first blocks may be assigned to two or more of the second blocks. Descriptions of the first blocks and the second blocks are already given above, and thus their descriptions will be omitted here.

The block selecting unit 630 may select second blocks, which are to be verified, by using various methods. For example, if there are N second blocks (where N is the number of second blocks), the block selecting unit 630 can select L second blocks (where L refers to a random integer between 1 and N, and L is the number of second blocks to be verified). If a user wants to verify only one of the second blocks, the value of L can be set to one.

If second blocks are divided into groups according to significance levels of data, L1 second blocks can be randomly selected from less significant second blocks, and L2 second blocks can be randomly selected from more significant second blocks (where L1 and L2 refer to random integers between 1 and N, L1 is the number of less significant second blocks to be verified, and L2 is the number of more significant second blocks to be verified). If a user doesn't want less significant second blocks verified, the value of L1 can be set to zero.

The signature verifying unit 640 verifies each of electronic signatures corresponding to each of the second blocks randomly selected by the block selecting unit 630 and outputs a verification result 650. Also, the signature verifying unit 640 may store the verification result 650.

The updating unit 620 may selectively update software data based on the verification result 650 stored in the signature verifying unit 640. In other words, the updating unit 620 searches verification failure history using the verification result 650 stored in the signature verifying unit 640 and updates software that failed to be verified to new software having a valid electronic signature. Alternatively, the updating unit 620 may not update the software to new software having a valid electronic signature, and the signature verifying unit 640 may output a result of verification failure. In this case, a user can no longer use the software.

Figure 7:
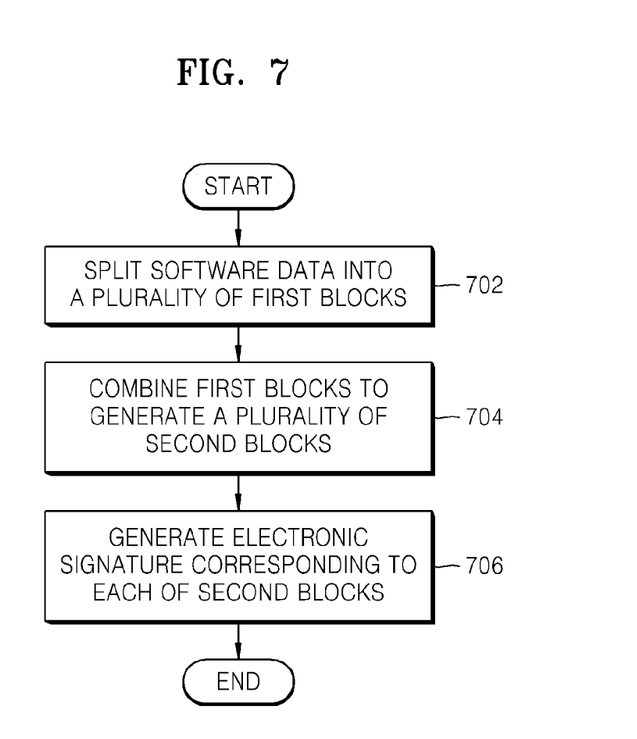
FIG. 7 is a flowchart illustrating a method of generating an electronic signature of software data according to an exemplary embodiment of the present invention.

FIG. 7 is a flowchart illustrating a method of generating an electronic signature of software data according to an embodiment of the present invention.

Figure 8:
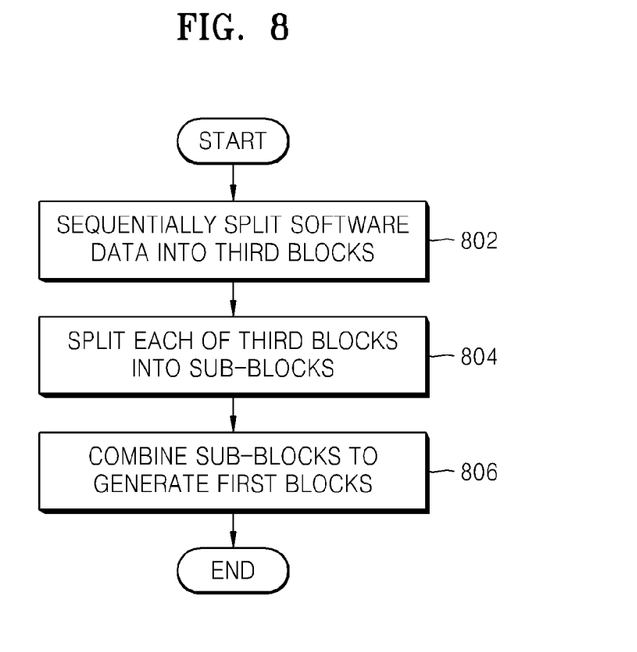
FIG. 8 is a flowchart illustrating a process of splitting software data into first blocks.

Referring to FIG. 7, an electronic signature generating apparatus splits input software data into a plurality of first blocks each having a pre-determined data capacity (operation 702). For example, referring to FIG. 8, the electronic signature generating apparatus sequentially splits the input software data into a plurality of third blocks each having a pre-determined data capacity larger than that of each of the first blocks (operation 802). The electronic signature generating apparatus thereafter splits each of the third blocks into one or more sub-blocks, each having a pre-determined capacity smaller than or equal to that of each of the third blocks (operation 804). Then, the electronic signature generating apparatus may generate a first block by combining the sub-blocks belonging to either the same third block or different third blocks (operation 806). Descriptions of the first blocks and the third blocks are already given above, and thus their descriptions will be omitted here.

The electronic signature generating apparatus generates a plurality of second blocks by combining the first blocks (operation 704). For example, when the input software data includes M first blocks and N second blocks (where M refers to the number of the first blocks and N refers to the number of the second blocks), the electronic signature generating apparatus may assign an $m^{th}$ block of the first blocks to a particular second block corresponding to the value of m mod N (where M>N, 0<m<M, and M, N, and m are integers).

Also, the electronic signature generating apparatus may duplicately-assign some of the first blocks to two or more of the second blocks. Data capacities of the first blocks, the second blocks, and the third blocks may be fixed or may vary.

In operation 706, the electronic signature generating apparatus generates electronic signatures which each correspond to each of the second blocks. The electronic signature generating apparatus may calculate hash values which each correspond to each of the second blocks, and electronic signatures may be generated in correspondence to the hash values.

Figure 9:
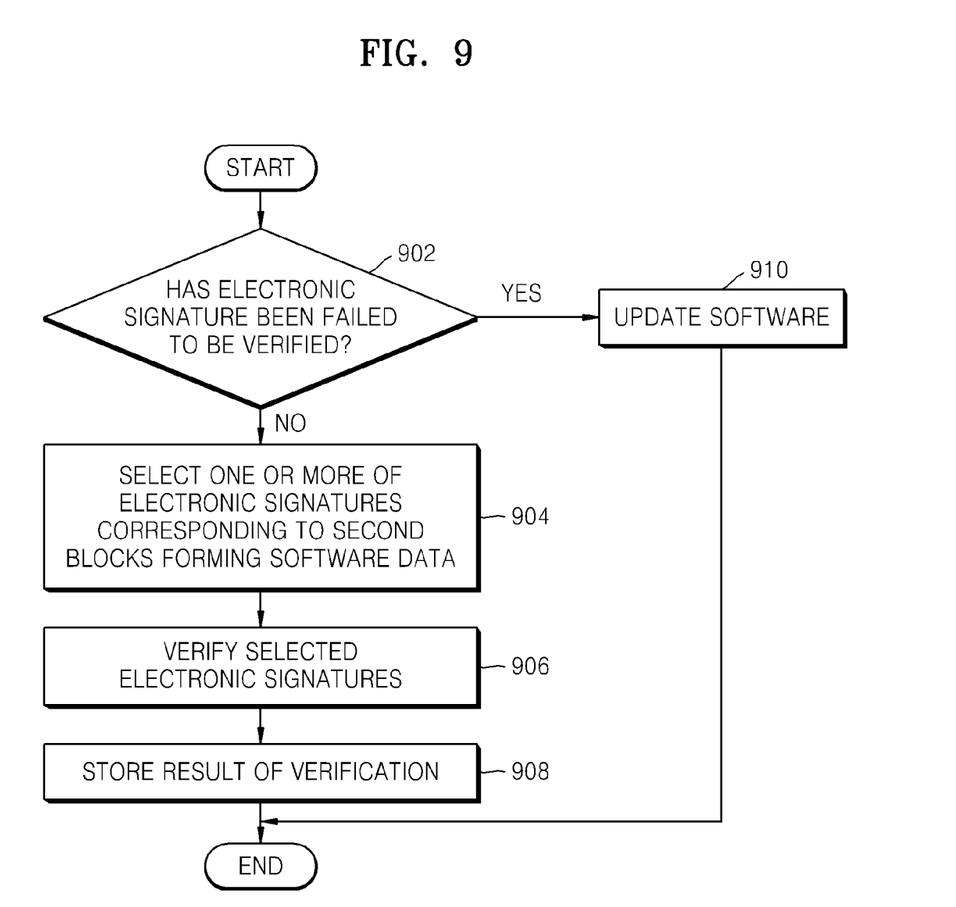
FIG. 9 is a flowchart illustrating a method of verifying an electronic signature of software data according to an exemplary embodiment of the present invention.

FIG. 9 is a flowchart illustrating another method of generating an electronic signature of software data according to an embodiment of the present invention.

Referring to FIG. 9, an electronic signature generating apparatus determines whether an electronic signature of software data has failed to be verified or not. The determination may be performed based on an electronic signature verification failure history, which is generated by an operation which will be described below and stored in a signature verifying unit. If it is determined that the electronic signature of the software data has failed to be verified, the electronic signature generating apparatus updates the software data to new software data (operation 910). If it is determined that the electronic signature of the software data has been verified, operation 904 is triggered.

In operation 904, the electronic signature generating apparatus randomly selects one or more electronic signatures corresponding to a plurality of second blocks forming the software data; the second blocks are generated by combining a plurality of first blocks each having a pre-determined data capacity, and the software data is split into the first blocks. Also, some of the first blocks may be duplicately-assigned to two or more of the second blocks, and data capacities of the first blocks and the second blocks may be fixed or may vary. Since a method of randomly selecting electronic signatures to be verified is described above, a description thereof will be omitted here.

In operation 906, the electronic signature generating apparatus verifies electronic signatures of the second blocks selected in the operation 904.

In operation 908, the electronic signature generating apparatus stores results of verifying the electronic signatures. The stored verification results may be used for determining whether to update software data or not in operation 902.

When a public key electronic signature is used, a time required to verify software data includes a time for calculating hash values of the software data and a time for calculating a public key password. Therefore, the time for calculating hash values can be reduced according to the present invention. For example, if N second blocks with a uniform significance level are generated, the time required for calculating hash values is reduced to 1/N (where N refers to the number of second blocks).

Also, failure to detect illegal modification of software data can be prevented by the storage of the verification failure history and the generation of the second blocks. For example, if data capacity of each of third blocks is 20 bytes, any illegal modification greater than 20 bytes can be detected.

The method of generating and verifying an electronic signature of software data can also be embodied as computer readable codes on a computer readable recording medium. The computer readable recording medium is any data storage apparatus that can store data which can be thereafter read by a computer system. Examples of the computer readable recording medium include read-only memory (ROM), random-access memory (RAM), CD-ROMs, magnetic tapes, floppy disks, and optical data storage apparatuses. The computer readable recording medium can also be distributed over network coupled computer systems so that the computer readable code is stored and executed in a distributed fashion.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of verifying an electronic signature of software data, the method comprising:

randomly selecting one or more of electronic signatures corresponding to a plurality of second blocks forming the software data; and verifying, by a processor, the selected electronic signatures, wherein the second blocks are generated by combining a plurality of first blocks each having a pre-determined data capacity, and the software data is split into the first blocks.

2. The method of claim 1, wherein some of the first blocks are duplicately-assigned to two or more of the second blocks.

3. The method of claim 1, wherein data capacities of the first blocks and the second blocks are fixed or vary.

4. The method of claim 1, wherein the verifying the selected electronic signatures further comprises storing results of verifying the electronic signatures, and selectively updating the software data based on the stored results of verifying the electronic signatures prior to randomly selecting one or more of the electronic signatures.

5. An apparatus for verifying an electronic signature of software data, the apparatus comprising:

a block selecting unit, implemented as hardware, which randomly selects one or more electronic signatures corresponding to a plurality of second blocks forming the software data; and a signature verifying unit, implemented as hardware, which verifies the selected electronic signatures, wherein the second blocks are generated by combining a plurality of first blocks each having a pre-determined data capacity, and the software data is split into the first blocks.

6. The apparatus of claim 5, wherein part of the some of the first blocks are duplicately-as signed to two or more of the second blocks.

7. The apparatus of claim 5, wherein the signature verifying unit stores results of verifying the electronic signatures, and the apparatus further comprises an updating unit which selectively updates the software data based on the stored results of verifying the electronic signatures.

8. A non-transitory computer readable recording medium having recorded thereon a computer program for executing a method of verifying an electronic signature of software data, the method comprising:
  randomly selecting one or more electronic signatures corresponding to a plurality of second blocks forming the software data; and
  verifying the selected electronic signatures,
  wherein the second blocks are generated by combining a plurality of first blocks each having a pre-determined data capacity, and the software data is split into the first blocks.

* * * * *